A. K. SMITH.
Oscillating-Joints for Pitman-Connections.

No. 167,948. Patented Sept. 21, 1875.

WITNESSES:
C. Neveux
A. F. Terry

INVENTOR:
A. K. Smith
BY
ATTORNEYS.

UNITED STATES PATENT OFFICE.

ALBERT K. SMITH, OF NEBRASKA, OHIO.

IMPROVEMENT IN OSCILLATING JOINTS FOR PITMAN-CONNECTIONS.

Specification forming part of Letters Patent No. 167,948, dated September 21, 1875; application filed May 8, 1875.

*To all whom it may concern:*

Be it known that I, ALBERT K. SMITH, of Nebraska, in the county of Pickaway and State of Ohio, have invented a new and useful Improvement in Oscillating Joints, of which the following is a specification:

My invention relates to oscillating joints for the connection of a pitman to the object to be moved by it; also, to the crank-pin, the object being to produce joints as nearly indestructible as possible, and at the same time simple and easy of construction, also easily detachable, and so that the parts may be readily duplicated, and also so that the slack caused by wear may be easily taken up and the wearing parts may be kept in their natural bearings.

The invention will first be described in connection with drawing, and then pointed out in the claim.

Figure 1:
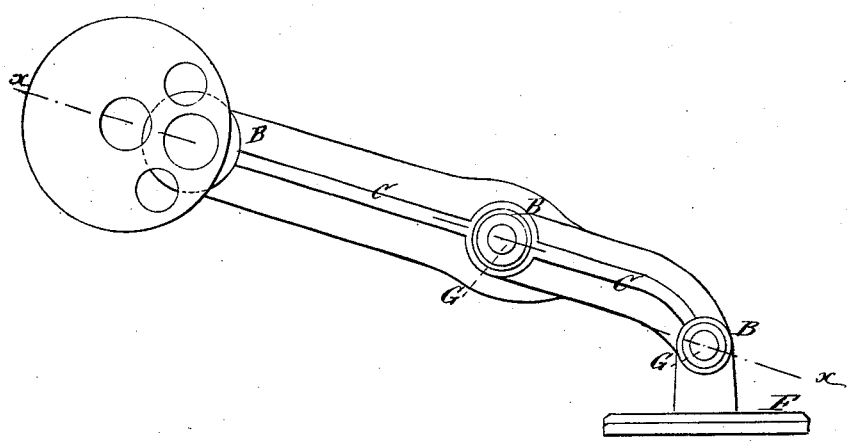
Figure 2:
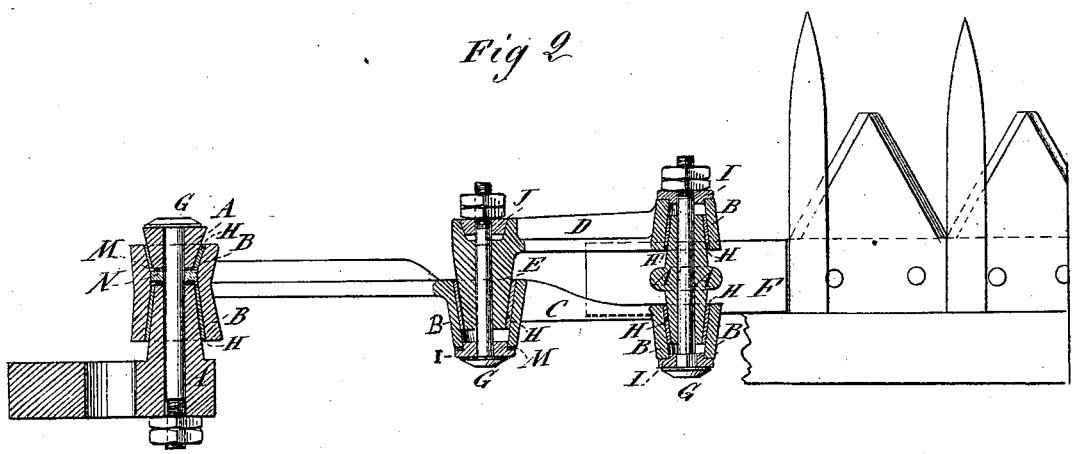

Figure 1 is a side elevation of the connecting-rod and the oscillating joints. Fig. 2 is a horizontal section on line $x\ x$ of Fig. 1.

Similar letters of reference indicate corresponding parts.

A represents a hollow double conical journal, in the form of two truncated cones joined at the base. B represents two socket-bearings for the journal, corresponding in shape to their conical form, one being formed on the connecting-rod C and the other on a short clamping-bar, D, having a hollow conical journal, E, projecting from the side of its opposite end parallel to the socket B. The journal A is attached at the middle to the cutter-bar F or other object to be moved by it, and it is clamped in the sockets by the bolt G, with anti-friction packing H, of rawhide or other substance, between the wearing-surfaces, the bolt being fitted in the washers I, which enter the ends of the sockets and center the bolt, and the hole through the journal being larger than the bolt, to allow it to come to its bearings without any interference by the bolt. This joint is modified in the crank-pin connection by making the sockets in one piece and the journal in two, the small end of the socket being joined and the two parts of the journal being clamped in the opposite sides by the bolt; and there is another modification of it in the connection of the clamping-bar D to the connecting-rod, in which one of the sockets is formed in one end of the journal, in which a conical washer, J, forms the other part of the journal. This form of the joint may be used in connecting the rod C to the crank-pin, the pin being in that case the socket in which the journal is clamped in the same manner.

In all cases the conical journals will be so fitted in the sockets as not to enter the full length, to allow space for tightening up the joints from time to time to take up the slack caused by wear.

The journal E should be packed with several layers of thin paper, to be removed from time to time as the other joint requires to be taken up, to allow the bar D to be kept parallel with the rod C, and thus prevent the cramping of the parts.

The bolt in the middle joint may be square, if preferred, as there is no oscillation of the journal when the joint is used for connecting a clamping-bar, D, to couple the rod C to a double conical journal, A; but when it is used for an oscillating joint the bolt may be round.

There is a packing of anti-friction material, M, between the washer and the socket of the middle joint, to be employed when the joint is to oscillate, and between the two parts of the wrist in the wheel-connection there is a washer, N, and packing M, to be clamped between the two parts of the wrist, and bind them together as an auxiliary aid to the square bolt, for holding the outer part of the wrist so as to turn in the socket and prevent it from turning on the bolt.

Having thus described my invention, I claim as new and desire to secure by Letters Patent—

The clamping-bar D, with journal E and socket B, combined with the double journal A and rod C, having two sockets, B, substantially as specified.

ALBERT K. SMITH.

Witnesses:
GEORGE HOFFHINES,
PETER H. HOFFHINES.